(12) United States Patent
Asano

(10) Patent No.: US 8,027,229 B2
(45) Date of Patent: Sep. 27, 2011

(54) FOCUS CONTROL DEVICE, AND OPTICAL DISC DEVICE

(75) Inventor: Takuya Asano, Ehime (JP)

(73) Assignee: Panasonic Corporation, Osaka (JP)

( * ) Notice: Subject to any disclaimer, the term of this patent is extended or adjusted under 35 U.S.C. 154(b) by 386 days.

(21) Appl. No.: 12/293,874

(22) PCT Filed: Mar. 19, 2007

(86) PCT No.: PCT/JP2007/055465

§ 371 (c)(1),
(2), (4) Date: Sep. 22, 2008

(87) PCT Pub. No.: WO2007/119411

PCT Pub. Date: Oct. 25, 2007

(65) Prior Publication Data

US 2009/0207709 A1   Aug. 20, 2009

(30) Foreign Application Priority Data

Mar. 22, 2006   (JP) ................................. 2006-078429

(51) Int. Cl.
*G11B 7/00* (2006.01)
(52) U.S. Cl. ................ 369/44.29; 369/44.31; 369/44.35; 369/44.36; 369/53.34
(58) Field of Classification Search .................. None
See application file for complete search history.

(56) References Cited

U.S. PATENT DOCUMENTS

| 6,240,055 B1 | 5/2001 | Takamine et al. | |
| 2007/0121443 A1* | 5/2007 | Kawashima et al. | ...... 369/44.29 |

FOREIGN PATENT DOCUMENTS

| JP | 9-35286 | 2/1997 |
| JP | 10-162379 | 6/1998 |
| JP | 2000-155961 | 6/2000 |
| JP | 2001-266370 | 9/2001 |
| JP | 2002-319155 | 10/2002 |
| JP | 2006-196126 | 7/2006 |
| JP | 2007-149285 | 6/2007 |

OTHER PUBLICATIONS

International Search Report issued Jun. 19, 2007 in the International (PCT) Application No. PCT/JP2007/055465.
Written Opinion of the ISA issued Jun. 19, 2007 in the International (PCT) Application No. PCT/JP2007/055465.

* cited by examiner

*Primary Examiner* — Joseph Haley
(74) *Attorney, Agent, or Firm* — Wenderoth, Lind & Ponack, L.L.P.

(57) ABSTRACT

In a device for controlling a focus to an optical disc having a land section and a groove section, the control is performed so as to avoid a focus step difference at a land-area/groove-area switching point.

When performing write-in or readout of data to an optical disc on which a land area and a groove area are continuously formed, using an optical pickup, there are provided a land learning unit (1) for determining a focus position in the land area, a groove learning unit (2) for determining a focus position in the groove area, and a focus position calculation unit (3) for determining a focus position in an area where the land area and the groove area are switched, and the focus position of the optical pickup is moved so that it is located at the third focus position when the switching signal is inverted according to the switching between the land area and the groove area.

10 Claims, 6 Drawing Sheets

FOCUS CONTROL DEVICE, AND OPTICAL DISC DEVICE

TECHNICAL FIELD

The present invention relates to a focus control device and an optical disc device, and more particularly, to a technique which can reduce distortion in focus control at a land/groove switching point in a recordable optical disc having lands and grooves.

BACKGROUND ART

In recent years, the number of recorder devices using recordable optical discs has been rapidly increased, and such recorder devices have come to be adopted not only for domestic applications but also for mobile fields. Further, as one of the conventional recordable optical discs, there is a phase change type disc (hereinafter referred to as "DVD-RAM") which can record data in both lands and grooves, and also development of mobile devices adopting such phase change type disc recording apparatus has been accelerated.

Hereinafter, a focus control in the conventional DVD-RAM recording device will be described.

A DVD-RAM medium is constituted having lands and grooves, and the optimum focus positions for the land and the groove are different from each other due to such as a step difference between them. So, in the conventional DVD-PAM recording device, the optimum focus positions as the jitter best positions are learned for the land and the groove, respectively, and the focus control is performed with switching the offset values thereof at the boundary between the land and the groove, thereby performing recording and reproduction (refer to Patent Document 1).

Patent Document 1: Japanese Published Patent Application No. 2000-155961 (Page 14, FIG. 9).

DISCLOSURE OF THE INVENTION

Problems to be Solved by the Invention

In the above-described conventional technique, however, since the jitter best position for the land is different from that for the groove, a focus step difference due to a difference in the optimum focus position occurs at the land/groove switching point as shown in FIG. 8. Usually, a focus servo filter of the optical disc has a derivative term, and a transient response occurs in a focus drive signal in response to a DC change due to this step difference, which causes an actuator magnetic sound.

That is, on the DVD-RAM medium, the land and the groove are alternately formed for each disc rotation, and thereby the actuator magnetic sound occurs at an interval of once every disc rotation.

Therefore, when the conventional DVD-RAM unit is mounted on a mobile device, the actuator magnetic sound that occurs at an interval of once every disc rotation is undesirably recorded in the recorded contents as a noise sound.

The present invention is performed to solve the above-described problems and has for its object to provide a focus control device and an optical disc device which adopt an optical disc having lands and grooves continuously formed as a recording medium, and prevent the actuator magnetic sound from occurring at the boundaries between the grooves and the lands.

Measures to Solve the Problems

In order to solve the above-described problems, according to the present invention, there is provided a focus control device which performs a focus control when write-in or read-out of data is performed using an optical pickup to an optical disc on which a land area and a groove area are continuously formed, comprising: a land area focus learning unit which determines a first focus position in the land area, and generates a first focus position signal; a groove area focus learning unit which determines a second focus position in the groove area, and generates a second focus position signal; a switching area focus position calculation unit which determines a third focus position in an area where the land area and the groove area are switched, and generates a third focus position signal; a switching signal generation unit which generates a switching signal whose polarity is inverted at the switching between the land area and the groove area; and a focus position control unit which adjusts the focus of the optical pickup to the first focus position when the switching signal indicates the land area, and adjusts the focus of the optical pickup to the second focus position when the switching signal indicates the groove area; and the focus position control unit moves the focus position of the optical pickup to the third focus position when the switching signal is inverted in accordance with the switching between the land area and the groove area.

Further, in the above-described focus control device, the third focus position is set between the first focus position and the second focus position, and when it is switched from the land area to the groove area, the focus position control unit moves the focus position of the optical pickup so that it is located at the third focus position from the first focus position when the switching signal is inverted, with taking a first predetermined time, and thereafter, moves the focus position of the optical pickup so that it is located at the second focus position after a third predetermined time from when the switching signal was inverted, and when it is switched from the groove area to the land area, it moves the focus position of the optical pickup so that it is located at the third focus position from the second focus position when the switching signal is inverted, with taking a fourth predetermined time, and thereafter, moves the focus position of the optical pickup so that it is located at the first focus position after a second predetermined time from when the switching signal was inverted.

Further, in the above-described focus control device, the focus position control unit comprises: a land offset generator which outputs a land focus offset value in the land area; a groove offset generator which outputs a groove focus offset value in the groove area; a wobble counter which detects and counts a wobble signal in the track direction of the optical disc; a first adder which adds the land focus offset value to the first focus position signal to output a first addition signal; a second adder which adds the groove focus offset value to the second focus position signal to output a second addition signal; and a selector which outputs the first addition signal when the switching signal indicates the land area, and outputs the second addition signal when the switching signal indicates the groove area.

Further, in the above-described focus control device, the land offset generator outputs the land focus offset value such that the first addition signal changes from the first focus position signal to the third focus position signal gradually with taking a first predetermined time when switching from the land area to the groove area, while the first addition signal changes from the third focus position signal to the first focus position signal gradually with taking a second predetermined time when switching from the groove area to the land area; and the groove offset generator outputs the groove focus offset value such that the second addition signal changes from the third focus position signal to the second focus position signal gradually with taking a third predetermined time when switching from the land area to the groove area, while the second addition signal changes from the second focus position signal to the third focus position signal gradually with taking a fourth predetermined time when switching from the groove area to the land area.

Further, in the above-described focus control device, the land area focus learning unit and the groove area focus learning unit learn the focus position at which the reproduction signal level becomes maximum, or the jitter value becomes minimum, or the error rate becomes minimum in the respective areas, thereby to generate the first focus position signal and the second focus position signal, respectively.

Further, according to the present invention, there is provided an optical disc device comprising: a rotation unit for rotating an optical disc having a thin film of a phase-change type recording material on which tracks are radially or concentrically formed at prescribed intervals, at a predetermined linear velocity; a focus actuator for varying the distance between the optical disc and an objective lens of an optical pickup; an objective lens driving unit having a tracking actuator for moving the objective lens in a direction perpendicular to the direction of tracks on the optical disc; a broad-band reproduction signal generator for generating, from a reflected light from the optical disc, a broad-band reproduction signal which is used for generating an RF signal, an address signal, and a wobble signal; a low-band reproduction signal generator for generating, from the reflected light from the optical disc, a low-band reproduction signal which is used for generating a servo signal; an RF envelope detector for, provided with a peak detector and a bottom detector, generating an RF envelope signal from the broad-band reproduction signal; a jitter detector for detecting a reproduction signal jitter from the broad-band reproduction signal; a wobble signal generator for detecting a wobble of a tracking groove of the optical disc from the broad-band reproduction signal, and binarizing the same to output a binary signal; an address detector for detecting the address information of the optical disc from the broad-band reproduction signal; a tracking controller for controlling the tracking actuator in accordance with the low-band reproduction signal; a land area focus learning unit for determining a first focus position in the land area of the optical disc in accordance with the RF envelope signal and the reproduction signal jitter; a groove area focus learning unit for determining a second focus position in the groove area of the optical disc in accordance with the RF envelope signal and the reproduction signal jitter; a switching area focus position calculation unit for determining a third focus position in an area where the land area and the groove area are switched; a switching signal generator for generating a switching signal whose polarity is inverted when a switching between the land area and the groove area is detected from the address information; a focus position controller for adjusting the focus of the optical pickup to the first focus position when the switching signal indicates the land area, while adjusting the focus of the optical pickup to the second focus position when the switching signal indicates the groove area, in accordance with the wobble signal generator, the first focus position, the second focus position, the third focus position, and the switching signal; and a focus controller for controlling the focus actuator of the optical disc on the basis of the low-band reproduction signal and the output signal of the focus position controller; and the focus position controller moves the focus position of the optical pickup so that it is located at the third focus position when the switching signal is inverted according to the switching between the land area and the groove area.

Further, in the above-described optical disc, the third focus position is set between the first focus position and the second focus position, and when it is switched from the land area to the groove area, the focus position control unit moves the focus position of the optical pickup so that it is located at the third focus position from the first focus position when the switching signal is inverted, with taking a first predetermined time, and thereafter, moves the focus position of the optical pickup so that it is located at the second focus position after a third predetermined time from when the switching signal was inverted, and when it is switched from the groove area to the land area, the focus position control unit moves the focus position of the optical pickup so that it is located at the third focus position from the second focus position when the switching signal is inverted, with taking a fourth predetermined time, and thereafter, moves the focus position of the optical pickup so that it is located at the first focus position after a second predetermined time from when the switching signal was inverted.

Further, in the above-described optical disc device, the focus position control unit comprises: a land offset generator which outputs a land focus offset value in the land area; a groove offset generator which outputs a groove focus offset value in the groove area; a wobble counter which detects and counts a wobble signal in the track direction of the optical disc; a first adder which adds the land focus offset value to the first focus position signal to output a first addition signal; a second adder which adds the groove focus offset value to the second focus position signal to output a second addition signal; and a selector which outputs the first addition signal when the switching signal indicates the land area, and outputs the second addition signal when the switching signal indicates the groove area.

Further, in the above-described optical disc device, the land offset generator outputs the land focus offset value such that the first addition signal changes from the first focus position signal to the third focus position signal gradually with taking a first predetermined time when switching from the land area to the groove area, while the first addition signal changes from the third focus position signal to the first focus position signal gradually with taking a second predetermined time when switching from the groove area to the land area; and the groove offset generator outputs the groove focus offset value such that the second addition signal changes from the third focus position signal to the second focus position signal gradually with taking a third predetermined time when switching from the land area to the groove area, while the second addition signal changes from the second focus position signal to the third focus position signal gradually with taking a fourth predetermined time when switching from the groove area to the land area.

Further, in the above-described optical disc device, the land area focus learning unit and the groove area focus learning unit learn the focus position at which the reproduction signal level becomes maximum, or the jitter value becomes minimum, or the error rate becomes minimum in the respective areas, thereby to generate the first focus position signal and the second focus position signal, respectively.

Effects of the Invention

As described above, according to the present invention, it is possible to provide a focus control device which prevents an actuator magnetic sound due to a transient response even when recording is performed to an optical disc medium such as a DVD-RAM on which lands and grooves are alternately and continuously formed and have different best focus positions, respectively.

Further, according to the present invention, it is possible to provide an optical disc device which prevents an actuator magnetic sound due to a transient response even when recording is performed to an optical disc medium such as a DVD-RAM on which lands and grooves are alternately and continuously formed and have different best focus positions, respectively.

DESCRIPTION OF REFERENCE NUMERALS

Figure 1:
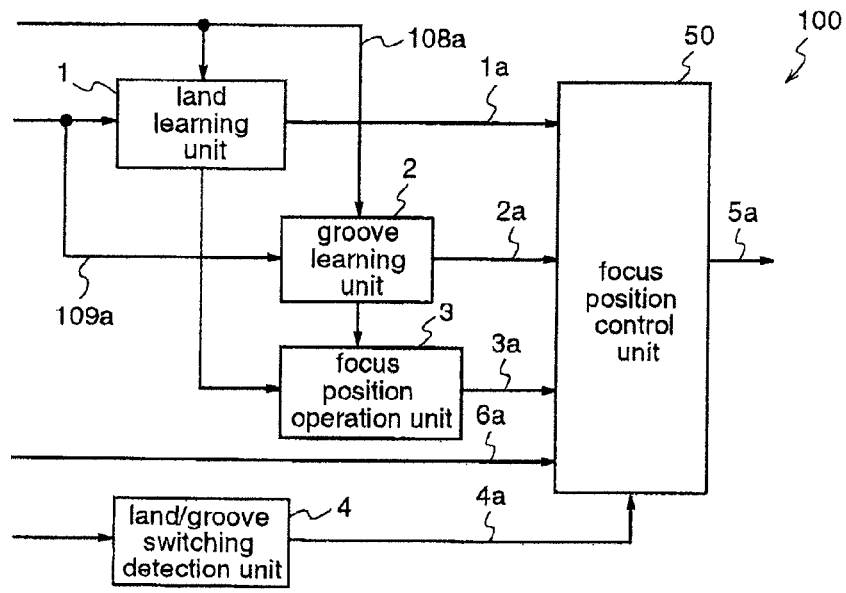
FIG. 1 is a block diagram of a focus control device 100 according to a first embodiment of the present invention.

100 . . . focus control device
200 . . . optical disc device
1 . . . land learning unit
1a . . . first focus position signal
2 . . . groove learning unit
2a . . . second focus position signal
3 . . . focus position calculation unit
3a . . . third focus position signal
4 . . . land/groove switching detection unit
4a . . . land/groove switching signal
50 . . . focus position control unit
5a . . . focus position control signal
6a . . . wobble signal
101 . . . optical disc
102 . . . spindle motor
103 . . . objective lens driving unit of optical pickup
104 . . . broad-band reproduction signal generation unit
105 . . . low-band reproduction signal generation unit
106 . . . tracking control unit
107 . . . focus control unit
108 . . . RF envelope detection unit
109 . . . jitter detection unit
110 . . . wobble signal generation unit
111 . . . address detection unit

BEST MODE TO EXECUTE THE INVENTION

Hereinafter, preferred embodiments of a focus control device and an optical disc device according to the present invention will be described with reference to the drawings.

Embodiment 1

FIG. 1 is a block diagram illustrating a focus control device 100 according to the first embodiment of the present invention.

In FIG. 1, a land learning unit 1 learns an optimum focus position in a land, and outputs the position as a first focus position signal 1a. A groove learning unit 2 learns an optimum focus position in a groove, and outputs the position as a second focus position signal 2a. A focus position calculation unit 3 calculates an optimum focus position at a land/groove switching point in accordance with the information from the land learning unit 1 and the groove learning unit 2, and outputs the same as a third focus position signal 3a. A land/groove switching detection unit 4 detects a land/groove switching to output a land-groove switching signal 4a. A focus position control unit 50 generates a focus position control signal 5a for driving a focus servo (not shown) in accordance with the first focus position signal 1a, the second focus position signal 2a, the third focus position signal 3a, and the land/groove switching signal 4a.

Hereinafter, the respective units shown in FIG. 1 will be described in more detail.

The land learning unit 1 comprises an RF envelope signal maximum focus position detector and a jitter best focus position detector, and generates a first focus position signal 1a from an RF envelope signal and jitter amount information which are detected from a signal obtained by reproducing the land area. Hereinafter, the operation of learning an optimum focus position will be described with reference to FIG. 2.

Figure 2A:
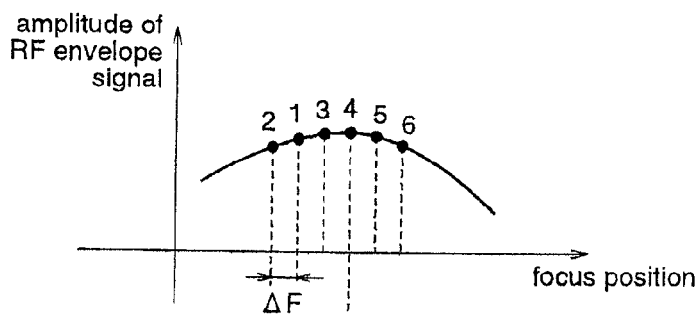
FIG. 2 is a diagram for explaining a search for a focus best position in the focus control device 100 according to the first embodiment.
Figure 2B:
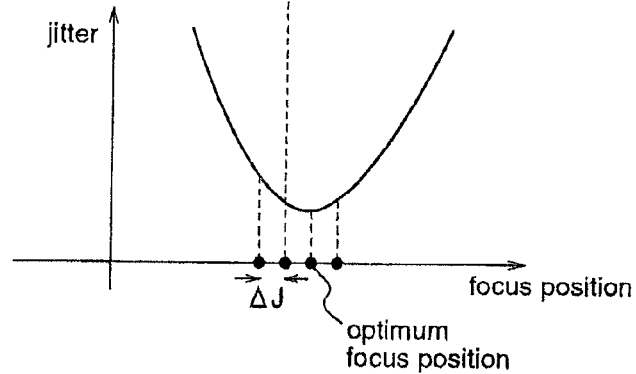

FIG. 2(a) is a graph showing an RF envelope signal maximum focus position search, and FIG. 2(b) is a graph showing a jitter best focus position search, which are performed with varying the focus position.

The RF envelope signal maximum focus position search will be described with reference to FIG. 2(a).

In FIG. 2(a), the abscissa shows the focus position, and the ordinate shows the amplitude of the RF envelope signal. Initially, the rough learning by the RF envelope signal maximum focus position search will be described.

Initially, an initial value is set to the focus position control signal 5a, and a first RF envelope signal is measured. Next, the focus position control signal 5a is decreased by a predetermined offset ($\Delta F$), and a second RF envelope signal is measured. Then, the first RF envelope signal and the second RF envelope signal are compared with each other, and a next focus position control signal 5a is set in accordance with the RF envelope signal having the larger amplitude. In this first embodiment, since the amplitude of the first RF envelope signal is larger than that of the second RF envelope signal, a third RF envelope signal is measured with increasing the focus position control signal 5a by $2\Delta F$ from the position of the second RF envelope signal, and thereafter, a fourth RF envelope signal, a fifth RF envelope signal, and a sixth RF envelope signal are successively measured with varying the focus position control signal 5a by $\Delta F$. As is evident from FIG. 2(a), the fourth RF envelope signal takes the maximum value in this first embodiment.

Next, the jitter best focus position search in the land area will be described with reference to FIG. 2(b). In FIG. 2(b), the abscissa shows the focus position, and the ordinate shows the jitter amount.

Initially, an initial value is set to the focus position control signal 5a. In this first embodiment, a focus position taking the fourth RF envelope signal, at which the RF envelope signal becomes the maximum value, is set, and a current jitter is measured.

Next, the focus position control signal 5a is decreased by a predetermined offset ($\Delta J$), and a second jitter is measured. Then, the current jitter and the second jitter are compared with each other, and the next focus position setting is performed in accordance with the smaller jitter, and thereafter, the process is similarly repeated to search for a focus position at which the minimum jitter is obtained. At this time, the change in the jitter amount with the change in the focus position is represented by the curve shown in FIG. 2(b), and the optimum focus position having the minimum jitter amount is outputted as the first focus position signal 1a.

The groove learning unit 2 comprises an RF envelope signal maximum focus position detector and a jitter best focus position detector, and generates a second focus position signal 2a in accordance with an RF envelope signal and jitter amount information which are detected from the signal obtained by reproducing the groove area. In this first embodiment, since the RF envelope signal maximum focus position learning has initially been performed in the land, the jitter best focus position search is performed using the result of this learning as an initial value, in the similar manner as that for the land area focus position learning, thereby to learn the optimum focus position in the groove area. Then, the optimum focus position is outputted as the second focus position signal 2a.

Figure 3:
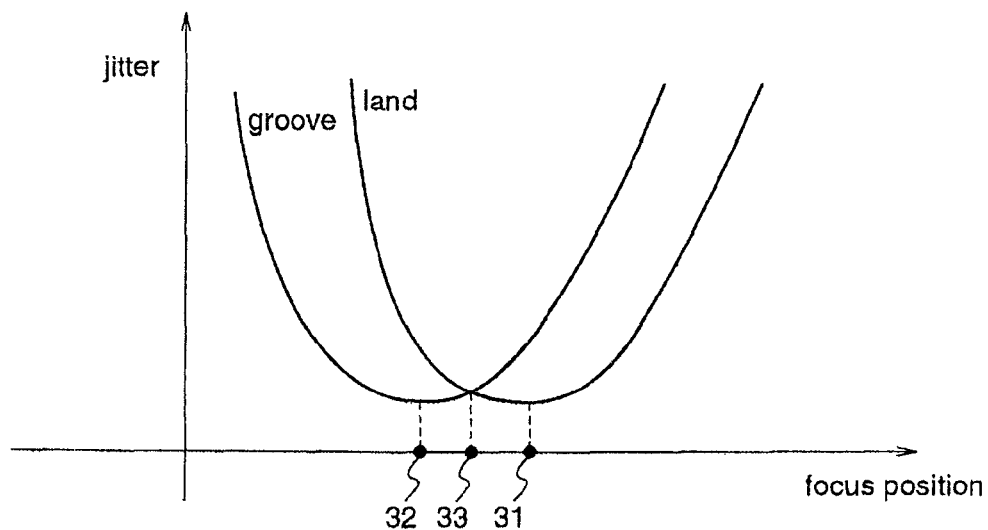
FIG. 3 is a diagram illustrating a land area focus position, a groove area focus position, and a focus position at a land/groove switching point.

The focus position calculation unit 3 calculates a focus position at the land/groove switching point, and more particularly, it obtains an intersection point of the land-area jitter curve obtained by the land learning unit 1 and the groove jitter curve obtained by the groove learning unit 2, and sets the focus position at the intersection point as the optimum focus position at the land/groove switching point. Then, the value is outputted as a focus position signal 3a. For example, as for an optical disc in which the land-area jitter curve and the groove-area jitter curve have the characteristics as shown in FIG. 3, the focus position 31 is the first focus position signal 1a, the focus position 32 is the second focus position signal 2a, and the focus position 33 is the third focus position signal 3a.

The land-groove switching detection unit 4 performs a land/groove switching on the basis of address information detected from a CAPA (Complementary Allocated Pit Address) area. Hereinafter, the track format of the DVD-RAM will be briefly described with reference to FIG. 4.

Tracks are constituted by land tracks and groove tracks, and the land tracks are concave tracks viewed from the laser light incident surface while the groove tracks are convex tracks viewed from the laser light incident surface. The land tracks and the groove tracks constitute a continuous single track from the inner circumference toward the outer circumference while being alternately connected with each other at predetermined positions for each cycle. The depth between the land and the groove is set to (laser wavelength/6) in order to minimize the influence of crosstalk. Since the land track and the groove track have different phase shifts of reflection light, the light spots received by the four-division photodetector 105 become symmetric with respect to the track axis, and thereby the polarity of a push-pull tracking error signal is inverted.

The disc is divided into plural zones, and a predetermined number (n pieces) of sectors, which number is unique to each zone, are provided for each cycle of the disc. Each sector comprises a CAPA area in which addresses are formed during disc formation and a recording area in which the user can record data.

Figure 4:
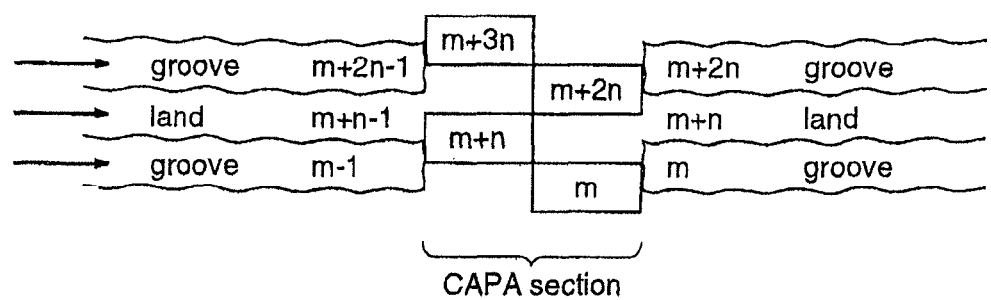
FIG. 4 is a diagram illustrating a track format of a general DVD-RAM.

As shown in FIG. 4, in the groove, the address of the (m)th sector behind the CAPA area becomes effective at the switching point from the (m−1)th sector to the (m)th sector. In the land, the address of the (m+n)th sector before the CAPA area becomes effective at the switching point from the (m+n−1)th sector to the (m+n)th sector. The number of the remaining sectors up to the land/groove switching point is calculated as an expected value on the basis of the address information detected from the CAPA area, and a land/groove switching signal 4a is outputted when it reaches this expected value.

Figure 5:
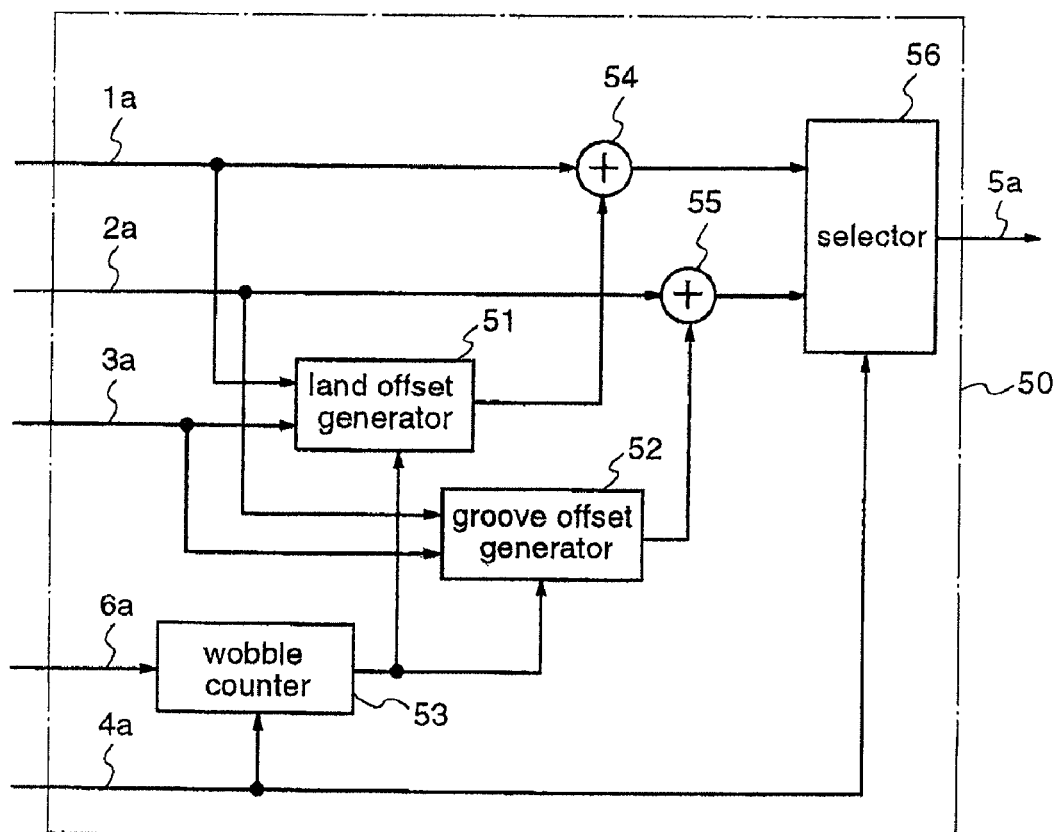
FIG. 5 is a block diagram of a focus position control unit 50 in the focus control device 100 according to the first embodiment.

As shown in FIG. 5, the focus position control unit 50 comprises a land offset generator 51 for setting a focus offset in the land, a groove offset generator 52 for setting a focus offset in the groove, a wobble counter 53 for counting a wobble signal 6a, a first adder 54 for adding the output signal of the land offset generator 51 to the first focus position signal 1a, a second adder 55 for adding the output signal of the groove offset generator 52 to the second focus position signal 2a, and a selector 56 for selecting either of the output of the first adder 54 or the output of the second adder 55 in accordance with the land/groove switching signal 4a. The focus position control unit 50 receives the first focus position signal 1a, the second focus position signal 2a, the third focus position signal 3a, the land-groove change signal 4a, and the wobble signal 6a.

The wobble counter 53 counts the wobble signal 6a that is inputted at regular intervals, and outputs the number of counts. The wobble counter 53 is cleared every time the land/groove switching signal 4a is inverted. For example, when L pieces of wobbles exist in the land track in a certain area, the output of the wobble counter 53 monotonically increases from 0 to L.

The land offset generator 51 receives the first focus position signal 1a, the third focus position signal 3a, and the counter value outputted from the wobble counter 53, and outputs an offset amount that is to be added to the first focus signal 1a in the first adder 54. Similarly, the groove offset generator 52 receives the second focus position signal 2a, the third focus position signal 3a, and the counter value outputted from the wobble counter 53, and outputs an offset amount that is to be added to the second focus signal 2a in the second adder 55.

The selector 56 selects the output signal of the first adder 54 when the land/groove switching signal 4a indicates the land while selects the output signal of the second adder 55 when the land/groove switching signal 4a indicates the groove, and outputs the focus position control signal 5a.

The operation of the focus control device 100 of the first embodiment constructed as described above will be described with reference to FIG. 6.

Figure 6:
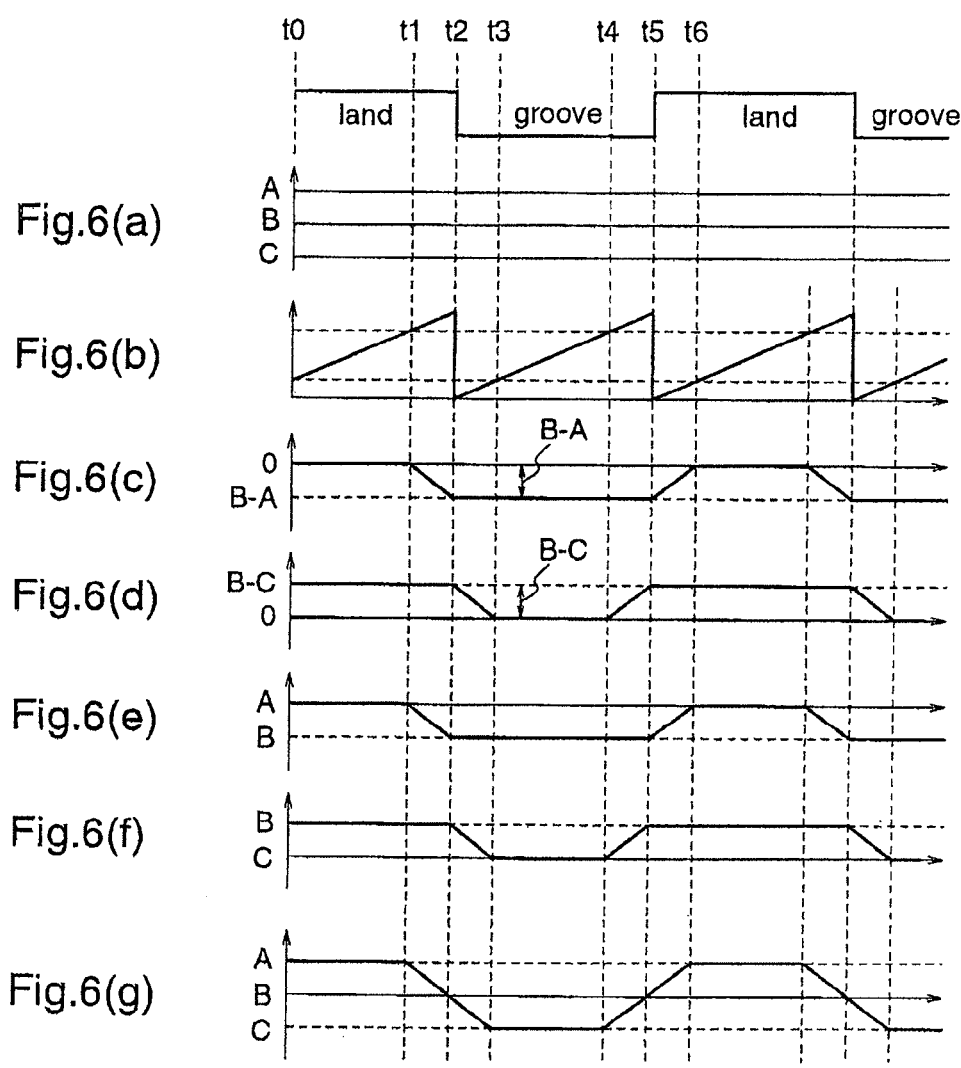
FIG. 6 is a timing chart illustrating internal block outputs of the focus position control unit 50 in the focus control device 100 according to the first embodiment.

FIG. 6 is a diagram for explaining the focus position control at the switching point between the land area and the groove area.

FIG. 6(a) shows a focus position A in the land area (the first focus position signal 1a), a focus position B at the land/groove switching point (the third focus position signal 3a), and a focus position C in the groove area (the second focus position signal 2a), FIG. 6(b) shows the output signal of the wobble counter 53, FIG. 6(c) shows the output signal of the land offset generator 51, FIG. 6(d) shows the output signal of the groove offset generator 52, 6(e) shows the output signal of the first adder 54, FIG. 6(f) shows the output signal of the second adder 55, and FIG. 6(g) shows the focus position control signal 5a.

Next, the focus position control at the switching point between the land area and the groove area will be described.

Initially, at the time of start-up, the land learning unit 1 and the groove learning unit 2 learn the jitter best focus positions (the focus position A and the focus position C) in the land area and the groove area, respectively, and learn the relations between the respective focus positions and the jitters, thereby to obtain the focus position at the land/groove switching point. That is, as shown in FIG. 3, the intersection point of the land jitter curve and the groove jitter curve is obtained to be used as the focus position at the land/groove switching point (focus position B).

As one indicating the land jitter best focus position 31 (focus position A) shown in FIG. 3, the first focus position signal 1a is outputted from the land learning unit 1, as one indicating the groove best focus position 32 (focus position C), the second focus position signal 2a is outputted from the groove learning unit 2, and as one indicating the focus position at the land/groove switching point (focus position B), the third focus position signal 3a is outputted from the focus position calculation unit 3.

With reference to FIG. 6, in the land area starting from timing t1, the offset value "0" is outputted from the land offset generator 51, and the output of the adder 54 is the focus position A as shown in FIG. 6(e).

When the count value of the wobble counter 53 reaches a predetermined value at timing t1, the output of the land offset generator 51 monotonically decreases from "0" as shown in FIG. 6(c). When the output of the land offset generator 51 becomes "B-A" at timing t2 after a first predetermined period has passed from timing t1, the monotonic decrease stops, and the output of the land offset generator 51 is maintained at "B-A".

In the section from timing t1 to timing t2, the output of the land offset generator 51 monotonically decreases as described above with taking the first predetermined period (t2-t1), and thereby the output of the adder 54 monotonically decreases from the focus position A (first focus position signal 1a) to the focus position B (third focus position signal 3a) as shown in FIG. 6(e). In the land area, the output of the groove offset generator 52 is maintained at "B-C".

Next, when the focus position is switched from the land to the groove at timing t2, the wobble counter 53 is initialized, and the output of the groove offset generator 52 monotonically decreases from "B-C" as shown in FIG. 6(d). When the output of the groove offset generator 52 reaches "0" at timing t3 after a third predetermined period has passed from timing t2, the monotonic decrease stops, and the output of the groove offset generator 52 is maintained at "0".

In the section from timing t2 to timing t3, the output of the groove offset generator 52 monotonically decreases as described above with taking the third predetermined period (t3-t2), and thereby the output of the adder 55 monotonically decreases from the focus position B (third focus position signal 3a) to the focus position C (second focus position signal 2a) as shown in FIG. 6(f).

The selector 56 selects the output of the adder 54 during the period from timing t1 to timing t2, and selects the output of the adder 55 during the period from timing t2 to timing t3. As the result, when it is switched from the land to the groove, as shown in FIG. 6(g), the focus position control signal 5a continuously changes from the focus position A (first focus position signal 1a) to the focus position C (second focus position signal 2a) with taking a predetermined time in the vicinity of the land/groove switching point, and it takes the focus position B (third focus position signal 3a) at the land/groove switching point.

Next, in the groove area from timing t3, the output of the groove offset generator 52 is "0", and the output of the adder 55 becomes the focus position C, whereby the focus position C is outputted from the selector 56 as the focus position control signal 5a.

Thereafter, when the count value of the wobble counter 53 reaches the predetermined value at timing t4, the output of the groove offset generator 52 monotonically increases from "0" as shown in FIG. 6(d). When the output of the groove offset generator 52 becomes "B-A" at timing t5 after a fourth predetermined period has passed from timing t4, the monotonic increase stops, and the output of the groove offset generator 52 is maintained at "B-A".

In the section from timing t4 to timing t5, the output of the groove offset generator 52 monotonically increases as described above with taking the fourth predetermined time (t5-t4), and thereby the output of the adder 55 monotonically increases from the focus position C (second focus position signal 2a) to the focus position B (third focus position signal 3a) as shown in FIG. 6(f).

When it is switched from the groove to the land at timing t5, the wobble counter 53 is initialized, and the output of the land offset generator 51 monotonically increases from "B-A" as shown in FIG. 6(c). When the output of the land offset generator 51 reaches "0" at timing t6 after a second predetermined time has passed from timing t5, the monotonic increase stops, and the output of the land offset generator 51 is maintained at "0".

In the section from timing t5 to timing t6, the output of the land offset generator 51 monotonically increases as described above with taking the second predetermined time (t6-t5), and thereby the output of the adder 54 monotonically increases from the focus position B (third focus position signal 3a) to the focus position A (first focus position signal 1a) as shown in FIG. 6(e).

The selector 56 selects the output of the adder 55 during the period from timing t4 to timing 5, and selects the output of the adder 54 during the period from timing t5 to timing t6. As the result, when it is switched from the groove to the land, the focus position control signal 5a continuously changes from the focus position C (second focus position signal 2a) to the focus position A (first focus position signal 1a) with taking the predetermined time in the vicinity of the land/groove switching point, and it takes the focus position B (third focus position signal 3a) at the land/groove switching point, as shown in FIG. 6(g).

Thereafter, the same operation as described above is performed every time the land and the groove are switched, and thereby the focus position control signal 5a outputted from the selector 56 continuously changes with taking the predetermined time in the vicinity of the land/groove switching point, and it takes the focus position B (third focus position signal 3a) at every land/groove switching point.

As described above, according to the focus control device of this first embodiment, the focus control is performed such that the focus position is moved from the first or second focus position to the third focus position with taking a predetermined time in the vicinity of the land/groove switching point and it takes the third focus position at the land/groove switching point, and after the land/groove switching, it is moved from the third focus position to the respective optimum focus positions for the land and the groove with taking a predetermined time. This focus control enables the land/groove switching with minimizing the influence to the jitter. As the result, there occurs no step difference in the focus position at the land/groove switching point, and thereby occurrence of actuator magnetic sound is avoided, resulting in improved silent characteristics.

Embodiment 2

A second embodiment of the present invention relates to a disc device equipped with the focus control device of the first embodiment.

Figure 7:
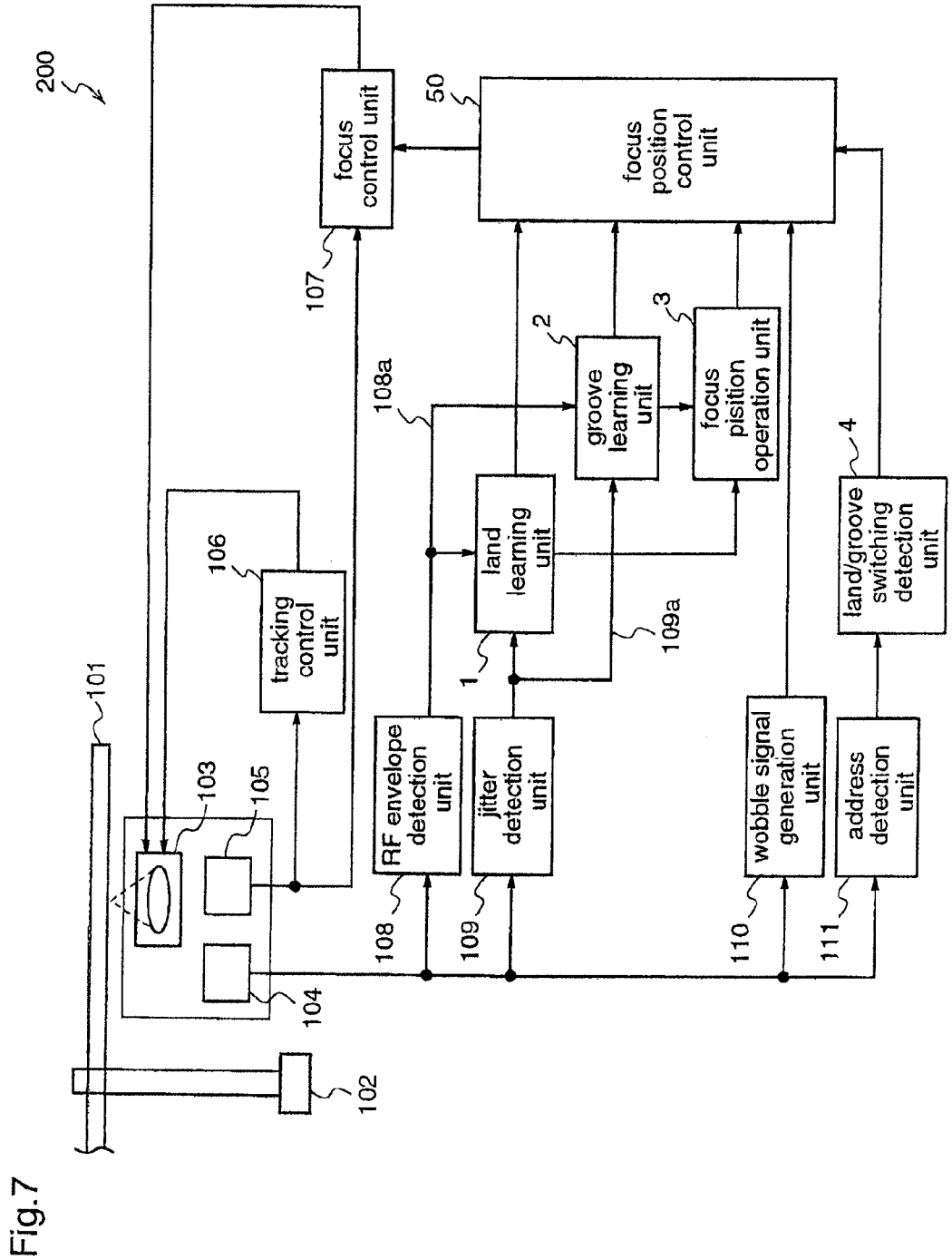
FIG. 7 is a block diagram of an optical disc device 200 according to a second embodiment of the present invention, which is equipped with the focus control device 100 of the first embodiment.
Figure 8:
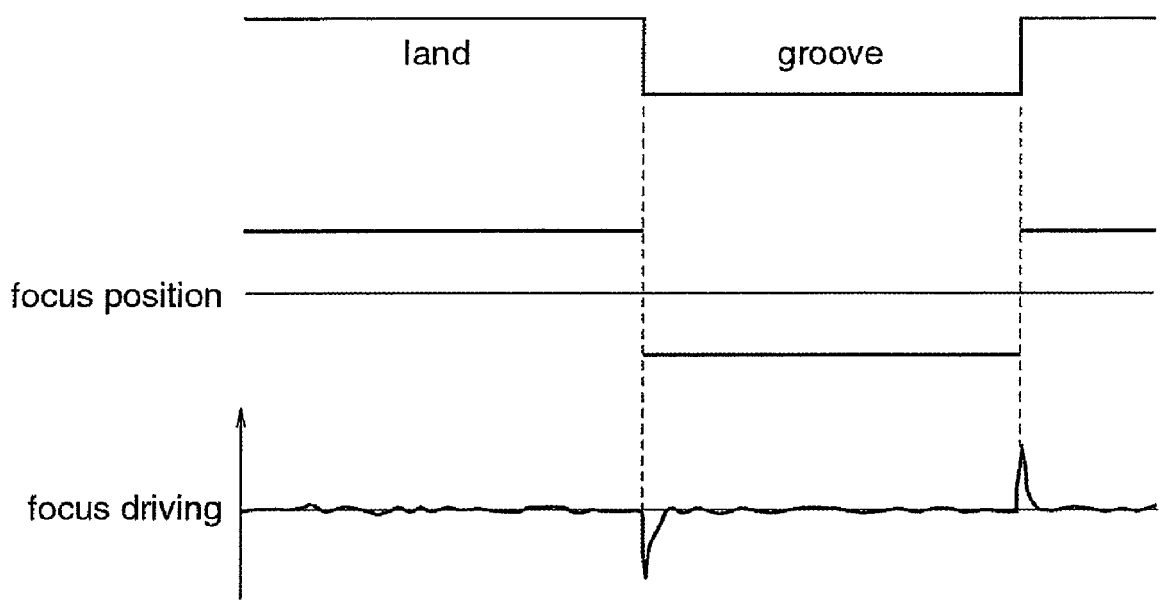
FIG. 8 is a timing chart illustrating a focus position and a focus driving in the conventional focus control device.

FIG. 7 is a diagram illustrating the construction of an optical disc device 200 of the second embodiment.

In FIG. 7, reference numeral 101 denotes an optical disc having a thin film of a phase-change type recording material, on which tracks are spirally or concentrically formed at prescribed intervals.

Further, reference numeral 102 denotes a spindle motor for rotating the optical disc 101 at a predetermined linear velocity. Reference numeral 103 denotes an objective lens driving unit of an optical pickup, which includes a focus actuator for controlling the distance between the objective lens and the optical disc 101, and a tracking actuator for moving the objective lens in the direction perpendicular to the track. Reference numeral 104 denotes a broad-band reproduction signal generation unit which is used for generating an RF signal, an address signal, and a wobble signal. Reference numeral 105 denotes a low-band reproduction signal generation unit which is used for generating a servo signal.

Further, reference numeral 108 denotes an RF envelope detection unit which includes a peak detector and a bottom detector, and generates an RF envelope signal from the output of the broad-band reproduction signal generation unit 104. Reference numeral 109 denotes a jitter detection unit which detects a reproduction signal jitter generated from the output of the broad-band reproduction signal generation unit 104. Reference numeral 110 denotes a wobble signal generation unit which detects wobbles in the tracking grooves of the optical disc 101 and binarizes the same, Reference numeral 111 denotes an address detection unit which detects addresses from a CAPA signal in which address information is prepitted, when a DVD-RAM is adopted.

Further, as described in the first embodiment, reference numeral 1 denotes a land learning unit, 2 denotes a groove learning unit, 3 denotes a focus position calculation unit, 4 denotes a land/groove switching detection unit, and 50 denotes a focus position control unit. Since the constructions and operations of these units are identical to those described in the first embodiment, repeated description is not necessary.

Further, reference numeral 106 denotes a tracking control unit which control the tracking actuator of the objective lens driving unit 103 on the basis of the output of the low-band reproduction signal generation unit 105. Reference numeral 107 denotes a focus control unit which controls the focus actuator of the lens driving unit 103 on the basis of the output of the low-band reproduction signal generation unit 105 and the output of the focus position control unit 50.

As described above, the optical disc device 200 of this second embodiment adopts the focus control device of the first embodiment. Therefore, as in the first embodiment, the focus control is performed such that, when it comes to land/groove switching point, the focus position is moved to the switching point focus position that is previously determined with taking a predetermined time and it takes the same focus position at the land/groove switching, and after the switching, it is moved to the respective optimum focus positions for the land and the groove, whereby the land/groove switching can be performed with minimizing the influence to the jitter. As the result, there occurs no step difference in the focus position at the land area/groove area switching point, and thereby occurrence of actuator magnetic sound is avoided, resulting in an optical disc device with improved silence characteristics.

APPLICABILITY IN INDUSTRY

In the focus control device and the optical disc device according to the present invention, when recording is performed to an optical disc medium in which lands and grooves are alternately formed and have different best focus positions, respectively, occurrence of actuator magnetic sound due to a transient response is avoided. Therefore, it is useful as a recording device or the like to be mounted on a mobile apparatus.

The invention claimed is:

1. A focus control device which performs a focus control when write-in or readout of data is performed using an optical pickup to an optical disc on which a land area and a groove area are continuously formed, comprising:
 a land area focus learning unit which determines a first focus position in the land area, and generates a first focus position signal, and determines a land-area jitter curve;
 a groove area focus learning unit which determines a second focus position in the groove area, and generates a second focus position signal, and determines a groove-area jitter curve;
 a switching area focus position calculation unit which determines a third focus position, in an area where the land area and the groove area are switched, based on an intersection of the land-area jitter curve and the groove-area jitter curve, and generates a third focus position signal;
 a switching signal generation unit which generates a switching signal whose polarity is inverted at the switching between the land area and the groove area;
 a focus position control unit which adjusts the focus of the optical pickup to the first focus position when the switching signal indicates the land area, and adjusts the focus of the optical pickup to the second focus position when the switching signal indicates the groove area; and
 said focus position control unit moving the focus position of the optical pickup to the third focus position when the switching signal is inverted in accordance with the switching between the land area and the groove area.

2. A focus control device as defined in claim 1 wherein
 the third focus position is set between the first focus position and the second focus position; and
 when switching from the land area to the groove area, when the switching signal is inverted said focus position control unit moves the focus position of the optical pickup from the first focus position to the third focus position in such a manner that it takes a first predetermined amount of time for the focus position to be switched from the first focus position to the third focus position, and thereafter, moves the focus position of the optical pickup so that it is located at the second focus position after a third predetermined amount time from when the switching signal was inverted, and
 when switching from the groove area to the land area, when the switching signal is inverted said focus position control unit moves the focus position of the optical pickup from the second focus position to the third focus position in such a manner that it takes a fourth predetermined amount of time for the focus position to be switched from the second focus position to the third focus position, and thereafter, moves the focus position of the optical pickup so that it is located at the first focus position after a second predetermined amount of time from when the switching signal was inverted.

3. A focus control device as defined in claim 1 wherein said focus position control unit comprises:
 a land offset generator which outputs a land focus offset value in the land area;
 a groove offset generator which outputs a groove focus offset value in the groove area;
 a wobble counter which detects and counts a wobble signal in the track direction of the optical disc;

a first adder which adds the land focus offset value to the first focus position signal to output a first addition signal;

a second adder which adds the groove focus offset value to the second focus position signal to output a second addition signal; and a selector which outputs the first addition signal when the switching signal indicates the land area, and outputs the second addition signal when the switching signal indicates the groove area.

4. A focus control device as defined in claim 3 wherein said land offset generator outputs the land focus offset value such that the first addition signal changes gradually from the first focus position signal to the third focus position signal in such a manner that it takes a first predetermined amount of time for the first addition signal to change from the first focus position signal to the third focus position signal, when switching from the land area to the groove area, and when switching from the groove area to the land area, the first addition signal changes gradually from the third focus position signal to the first focus position signal in such a manner that it takes a second predetermined amount of time for the first addition signal to change from the third position signal to the first position signal; and said groove offset generator outputs the groove focus offset value such that the second addition signal changes gradually from the third focus position signal to the second focus position signal in such a manner that it takes a third predetermined amount of time for the second addition signal to change from the third focus position signal to the second focus position signal, when switching from the land area to the groove area, and when switching from the groove area to the land area, the second addition signal changes gradually from the second focus position signal to the third focus position signal in such a manner that it takes a fourth predetermined amount of time for the second addition signal to change from the second focus position signal to the third focus position signal.

5. A focus control device as defined in claim 1 wherein said land area focus learning unit and said groove area focus learning unit learn the focus position at which the reproduction signal level becomes maximum, or the jitter value becomes minimum, or the error rate becomes minimum in the respective areas, thereby to generate the first focus position signal and the second focus position signal, respectively.

6. An optical disc device comprising:

a rotation unit for rotating an optical disc having a thin film of a phase-change type recording material on which tracks are radially or concentrically formed at prescribed intervals, at a predetermined linear velocity;

a focus actuator for varying the distance between the optical disc and an objective lens of an optical pickup;

an objective lens driving unit having a tracking actuator for moving the objective lens in a direction perpendicular to the direction of tracks on the optical disc;

abroad-band reproduction signal generator for generating, from a reflected light from the optical disc, a broad-band reproduction signal which is used for generating an RF signal, an address signal, and a wobble signal;

a low-band reproduction signal generator for generating, from the reflected light from the optical disc, a low-band reproduction signal which is used for generating a servo signal;

an RF envelope detector for, provided with a peak detector and a bottom detector, generating an RF envelope signal from the broad-band reproduction signal;

a jitter detector for detecting a reproduction signal jitter from the broad-band reproduction signal;

a wobble signal generator for detecting a wobble of a tracking groove of the optical disc from the broad-band reproduction signal, and binarizing the same to output a binary signal;

an address detector for detecting the address information of the optical disc from the broad-band reproduction signal;

a tracking controller for controlling the tracking actuator in accordance with the low-band reproduction signal;

a land area focus learning unit for determining a first focus position in the land area of the optical disc in accordance with the RF envelope signal and the reproduction signal jitter;

a groove area focus learning unit for determining a second focus position in the groove area of the optical disc in accordance with the RF envelope signal and the reproduction signal jitter;

a switching area focus position calculation unit for determining a third focus position in an area where the land area and the groove area are switched;

a switching signal generator for generating a switching signal whose polarity is inverted when a switching between the land area and the groove area is detected from the address information;

a focus position controller for adjusting the focus of the optical pickup to the first focus position when the switching signal indicates the land area, while adjusting the focus of the optical pickup to the second focus position when the switching signal indicates the groove area, in accordance with the output signal of the wobble signal generator, the first focus position, the second focus position, the third focus position, and the switching signal;

a focus controller for controlling the focus actuator of the optical disc on the basis of the low-band reproduction signal and the output signal of the focus position controller; and said focus position controller moving the focus position of the optical pickup so that it is located at the third focus position when the switching signal is inverted according to the switching between the land area and the groove area.

7. An optical disc device as defined in claim 6 wherein the third focus position is set between the first focus position and the second focus position, and when switching from the land area to the groove area, when the switching signal is inverted said focus position control unit moves the focus position of the optical pickup from the first focus position to the third focus position in such a manner that it takes a first predetermined amount of time for the focus position to be switched from the first focus position to the third focus position, and thereafter, moves the focus position of the optical pickup so that it is located at the second focus position after a third predetermined amount of time from when the switching signal was inverted, and when switching from the groove area to the land area, when the switching signal is inverted said focus position control unit moves the focus position of the optical pickup from the second focus position to the third focus position in such a manner that it takes a fourth predetermined amount of time for the focus position to be switched from the second focus position to the third focus position, and thereafter, moves the focus position of the optical pickup so that it is located at the first focus position after a second predetermined amount of time from when the switching signal was inverted.

8. An optical disc device as defined in claim 6 wherein said focus position control unit comprises:
a land offset generator which outputs a land focus offset value in the land area;
a groove offset generator which outputs a groove focus offset value in the groove area;
a wobble counter which detects and counts a wobble signal in the track direction of the optical disc;
a first adder which adds the land focus offset value to the first focus position signal to output a first addition signal;
a second adder which adds the groove focus offset value to the second focus position signal to output a second addition signal; and
a selector which outputs the first addition signal when the switching signal indicates the land area, and outputs the second addition signal when the switching signal indicates the groove area.

9. An optical disc device as defined in claim 8 wherein said land offset generator outputs the land focus offset value such that the first addition signal changes gradually from the first focus position signal to the third focus position signal in such a manner that is takes a first predetermined amount of time for the first addition signal to change from the first focus position signal to the third focus position signal, when switching from the land area to the groove area, and when switching from the groove area to the land area, the first addition signal changes gradually from the third focus position signal to the first focus position signal in such a manner that is takes a second predetermined amount of time for the first addition signal to change from the third position signal to the first position signal; and
said groove offset generator outputs the groove focus offset value such that the second addition signal changes gradually from the third focus position signal to the second focus position signal in such a manner that it takes a third predetermined amount of time for the second addition signal to change from the third focus position signal to the second focus position signal, when switching from the land area to the groove area, and when switching from the groove area to the land area, the second addition signal changes gradually from the second focus position signal to the third focus position signal in such a manner that it takes a fourth predetermined amount of time for the second addition signal to change from the second focus position signal to the third focus position signal.

10. An optical disc device as defined in claim 6 wherein said land area focus learning unit and said groove area focus learning unit learn the focus position at which the reproduction signal level becomes maximum, or the jitter value becomes minimum, or the error rate becomes minimum in the respective areas, thereby to generate the first focus position signal and the second focus position signal, respectively.

* * * * *